(12) United States Patent
Neltner et al.

(10) Patent No.: US 9,029,286 B2
(45) Date of Patent: May 12, 2015

(54) BIOTEMPLATED INORGANIC MATERIALS

(71) Applicant: Massachusetts Institute of Technology, Cambridge, MA (US)

(72) Inventors: Brian Neltner, Boulder, CO (US); Angela M. Belcher, Lexington, MA (US)

(73) Assignee: Massachusettes Institute of Technology, Cambridge, MA (US)

( * ) Notice: Subject to any disclaimer, the term of this patent is extended or adjusted under 35 U.S.C. 154(b) by 0 days.

(21) Appl. No.: 13/872,280

(22) Filed: Apr. 29, 2013

(65) Prior Publication Data

US 2014/0080698 A1     Mar. 20, 2014

Related U.S. Application Data

(62) Division of application No. 12/911,340, filed on Oct. 25, 2010, now Pat. No. 8,431,506.

(60) Provisional application No. 61/254,473, filed on Oct. 23, 2009.

(51) Int. Cl.
| | |
|---|---|
| *B01J 20/00* | (2006.01) |
| *B01J 21/00* | (2006.01) |
| *B01J 21/04* | (2006.01) |

(Continued)

(52) U.S. Cl.
CPC *B01J 31/28* (2013.01); *B01J 23/10* (2013.01); *B01J 23/894* (2013.01); *B01J 23/96* (2013.01); *B01J 35/0013* (2013.01); *B01J 35/002* (2013.01); *B01J 35/006* (2013.01); *B01J 35/06* (2013.01); *B01J 35/1019* (2013.01); *B01J 35/1038* (2013.01); *B01J 37/0018* (2013.01); *B01J 37/031* (2013.01); *B01J 37/36* (2013.01); *B82Y 30/00* (2013.01); *C01B 3/326* (2013.01); *C01B 2203/0233* (2013.01); *C01B 2203/1041* (2013.01); *C01B 2203/1058* (2013.01); *C01B 2203/1064* (2013.01); *C01B 2203/1229* (2013.01)

(58) Field of Classification Search
CPC ............ B01J 31/28; B01J 31/38; B01J 31/32; B01J 35/10; B01J 21/00; B01J 23/00
USPC .......................... 502/240–439; 977/773, 775
See application file for complete search history.

(56) References Cited

U.S. PATENT DOCUMENTS

| | | |
|---|---|---|
| 7,332,321 B2 | 2/2008 | Belcher et al. |
| 7,407,527 B2 | 8/2008 | Hyeon |

(Continued)

OTHER PUBLICATIONS

Bodke et al., "The Effect of Ceramic Supports on Partial Oxidation of Hydrocarbons over Noble Metal Coated Monoliths," Journal of Catalysis, 1998, 179:138-149.

(Continued)

*Primary Examiner* — Cam N. Nguyen
(74) *Attorney, Agent, or Firm* — Foley & Lardner LLP

(57) ABSTRACT

A method of making a metal oxide nanoparticle comprising contacting an aqueous solution of a metal salt with an oxidant. The method is safe, environmentally benign, and uses readily available precursors. The size of the nanoparticles, which can be as small as 1 nm or smaller, can be controlled by selecting appropriate conditions. The method is compatible with biologically derived scaffolds, such as virus particles chosen to bind a desired material. The resulting nanoparticles can be porous and provide advantageous properties as a catalyst.

13 Claims, 13 Drawing Sheets

(51) Int. Cl.
| | |
|---|---|
| B01J 23/00 | (2006.01) |
| B01J 23/02 | (2006.01) |
| B01J 23/04 | (2006.01) |
| B01J 23/06 | (2006.01) |
| B01J 23/08 | (2006.01) |
| B01J 23/10 | (2006.01) |
| B01J 23/20 | (2006.01) |
| B01J 23/32 | (2006.01) |
| B01J 23/40 | (2006.01) |
| B01J 23/42 | (2006.01) |
| B01J 23/44 | (2006.01) |
| B01J 23/48 | (2006.01) |
| B01J 23/50 | (2006.01) |
| B01J 23/56 | (2006.01) |
| B01J 23/58 | (2006.01) |
| B01J 23/60 | (2006.01) |
| B01J 23/70 | (2006.01) |
| B01J 23/72 | (2006.01) |
| B01J 23/74 | (2006.01) |
| B01J 31/28 | (2006.01) |
| B01J 23/89 | (2006.01) |
| B01J 23/96 | (2006.01) |
| B01J 35/00 | (2006.01) |
| B01J 35/06 | (2006.01) |
| B01J 35/10 | (2006.01) |
| B01J 37/00 | (2006.01) |
| B01J 37/03 | (2006.01) |
| B01J 37/36 | (2006.01) |
| B82Y 30/00 | (2011.01) |
| C01B 3/32 | (2006.01) |

(56) References Cited

U.S. PATENT DOCUMENTS

| | | | |
|---|---|---|---|
| 7,488,593 | B2 | 2/2009 | Belcher et al. |
| 8,242,037 | B2 * | 8/2012 | Laine et al. ............. 501/94 |
| 8,507,402 | B1 * | 8/2013 | Biberger et al. ......... 502/232 |
| 8,535,632 | B2 * | 9/2013 | Chase et al. ............ 423/239.1 |
| 2006/0083694 | A1 * | 4/2006 | Kodas et al. ............. 424/46 |
| 2007/0264481 | A1 * | 11/2007 | DeSimone et al. ....... 428/220 |
| 2008/0014343 | A1 * | 1/2008 | Cayton et al. ........... 427/189 |
| 2008/0312070 | A1 * | 12/2008 | Talbot et al. ............ 502/80 |
| 2009/0162560 | A1 | 6/2009 | DeLuca et al. |
| 2009/0163656 | A1 | 6/2009 | DeLuca et al. |
| 2009/0269016 | A1 * | 10/2009 | Korampally et al. ...... 385/129 |
| 2009/0269619 | A1 | 10/2009 | Belcher et al. |
| 2009/0298684 | A1 * | 12/2009 | Zhou et al. ............. 502/326 |
| 2010/0112072 | A1 | 5/2010 | Wang et al. |
| 2010/0130346 | A1 * | 5/2010 | Laine et al. ............. 501/105 |
| 2010/0197481 | A1 * | 8/2010 | Brey et al. ............. 502/152 |
| 2010/0199547 | A1 * | 8/2010 | Reed ...................... 44/354 |
| 2010/0221159 | A1 * | 9/2010 | Insley et al. ............ 422/211 |
| 2010/0251856 | A1 | 10/2010 | Santhanam et al. |
| 2010/0273091 | A1 * | 10/2010 | Brey et al. ............. 429/513 |
| 2011/0294995 | A1 * | 12/2011 | Huo et al. .............. 536/23.1 |
| 2011/0311635 | A1 * | 12/2011 | Stucky et al. ........... 424/490 |
| 2012/0138538 | A1 * | 6/2012 | Crews et al. ............ 210/670 |

OTHER PUBLICATIONS

Brahma et al., "Magnetic and transport properties of nanostructured ferric oxide produced by mechanical attrition," Journal of Applied Physics, 2006, 100:044302-1-044302-6.

Chen et al., "Reactive Cerium(IV) Oxide Powders by the Homogeneous Precipitation Method," J. Am. Ceram. Soc., Jun. 1993, 76(6), 1577-1583.

Deshpande et al., "Size dependency variation in lattice parameter and valency states in nanocrystalline cerium oxide," Applied Physics Letters, 2005, 87:133113-1-133113-3.

Esch et al., "Electron Localization Determines Defect Formation on Ceria Substrates," Science, Jul. 29, 2005, 309:752-755.

Fu et al., "Active Nonmetallic Au and Pt Species on Ceria-Based Water-Gas Shift Catalysts," Science, Aug. 15, 2003, 301:935-938.

Fuchs et al., "Interaction of Pt and Rh nanoparticles with ceria supports: Ring opening of methylcyclobutane and CO hydrogenation after reduction at 373-723 K," Applied Catalysis A: General, 2005, 294:279-289.

Hirano et al., "Hydrothermal Synthesis of Cerium(IV) Oxide," J. Am. Ceram. Soc., Mar. 1996, 79(3):777-780.

Hirta et al., "Wet forming and sintering behavior of nanometer-sized ceria powder," Ceramics International, 2005, 31:1007-1013.

Idriss, H., "Ethanol Reactions over the Surfaces of Noble Metal/ Ceruim Oxide Catalysts," Platinum Metals Rev., 2004, 48(3):105-115.

Kugai et al., "Low-temperature reforming of ethanol over $CeO_2$-supported Ni—Rh bimetallic catalysts for hydrogen production," Catalysis Letters, Jun. 2005, 101(3-4):255-264.

Kugai et al., "Effects of nanocrystalline $CeO_2$ supports on the properties and performance of Ni—Rh bimetallic catalyst for oxidative steam reforming of ethanol," Journal of Catalysis, 2006, 238:430-440.

Liu et al,. "Original and Activity of Oxidized Gold in Water-Gas-Shift Catalysis," Physical Review Letters, May 20, 2005, 94:196102-1-196102-4.

Llorca et al., "Efficient Production of Hydrogen over Supported Cobalt Catalysts from Ethanol Steam Reforming," J. Catal., 2002, 209:306-317.

Masui et al., "Characterization of Cerium(IV) Oxide Ultrafine Particles Prepared Using Reversed Micelles," Chem. Mater., 1997, 9:2197-2204.

Morrison et al., Prepr. Pap.-Am. Chem. Soc., Div. Petr. Chem. 2006, 51, 26.

Mullins et al., "Electron spectroscopy of single crystal and polycrystalline cerium oxide surfaces," Surface Science, 1998, 409:307-319.

Nam et al., "Virus-Enabled Synthesis and Assembly of Nanowires for Lithium Ion Battery Electrodes," Science, May 12, 2006, 312:885-888.

Romeo et al., "XPS Study of the Reduction of Cerium Dioxide," Surface and Interface Analysis, 1993, 20:508-512.

Salge et al., "Catalytic partial oxidation of ethanol over noble metal catalysts," Journal of Catalysis, 2005, 23:69-78.

Sato et al., "Synthesis and UV-shielding properties of calcia-doped ceria nanoparticles coated with amorphous silica," Solid State Ionics, 2004, 172:377-382.

Sheng et al., "$H_2$ Production from Ethanol over Rh-PT/$CeO_2$ Catalysts: The Role of Rh for the Efficient Dissociation of the Carbon-Carbon Bond," Journal of Catalysis, 2002, 208:393-403.

Wang et al., "Stream reforming of ethanol over $Co_3O_4$/$CeO_2$ Catalysts prepared by different methods," Catal. Today, 2007, 129:305-312.

Yamashita et al., "Synthesis and microstructure of calcia doped ceria as UV filters," Journal of Materials Science, 2002, 37:683-687.

Yu et al., "Synthesis of Cerium(IV) Oxide Ultrafine Particles by Solid-State Reactions," J. Am. Ceram. Soc., 2000, 83(4):964-966.

Zerva et al., "Ceria catalysts for water gas shift reaction: Influence of preparation method on their activity," Applied Catalysis B: Environmental, 2006, 67:105-112.

Zhang et al., "Cerium oxidation state in ceria nanoparticles studied with X-ray photoelectron spectroscopy and absorption near edge spectroscopy," Surface Science, 2004, 563:74-82.

Tsoncheva et al., "Cobalt-modified mesoporous MgO, $ZrO_2$ and $CeO_2$ oxides as catalysts for methanol decomposition."

Jones et al., "Steam reforming of methanol over $CeO_2$ and $ZrO_2$-promoted Cu—ZnO catalysts supported on nanoparticle $Al_2O_3$," Applied Catalysis B: Environmental, 2009, 90:195-204.

Nelter et al., "Production of Hydrogen Using Nanocrystalline Protein-Templated Catalysts on M13 Phage," ACS Nano, 2010, 4(6):3227-3235.

* cited by examiner ated Oct. 25, 2010, which claims priority to provisional U.S. Patent Application No. 61/254,473, filed Oct. 23, 2009, which are incorporated by reference in their entirety.

BIOTEMPLATED INORGANIC MATERIALS

CROSS-REFERENCE TO RELATED APPLICATIONS

This application is a Divisional of U.S. patent application Ser. No. 12/911,340, filed Oct. 25, 2010, which claims priority to provisional U.S. Patent Application No. 61/254,473, filed Oct. 23, 2009, which are incorporated by reference in their entirety.

FEDERALLY SPONSORED RESEARCH OR DEVELOPMENT

This invention was made with government support under Grant No. DAAD19-03-D-0004 awarded by the Army Research Office. The government has certain rights in the invention.

TECHNICAL FIELD

This invention relates to biotemplated inorganic materials.

BACKGROUND

Hydrogen is a useful energy source in fuel cells and batteries. Because it is difficult to obtain hydrogen from a gas source, it can be desirable to obtain it from a liquid source. Liquid fuels can also provide higher energy densities than gaseous fuels. A catalyst may be used to obtain hydrogen from a liquid source such as ethanol. Catalysts should be relatively inexpensive, highly active and stable. Efficiency and stability of catalysts are affected by surface area, physical isolation and fixation of metals, the presence of active materials near the surface of the 3-D structure, and sintering stability, among other factors.

SUMMARY

Metal oxides represent a very large class of materials useful in a variety of applications including electronics, optics, ceramics, and catalysts. Many applications that are dependent upon the surface area of the material or size of the crystallite domain can be further enhanced through the use of the nanoparticle form of metal oxides. As such, metal oxide nanoparticles have garnered much research interest over the past few decades, both in novel applications and new synthesis methods.

In general, size control is desirable in nanoparticle synthesis, and small, monodisperse nanoparticles can be especially useful. Reaction conditions are preferably safe and environmentally friendly (e.g., limiting the quantity of organic solvents and hazard reagents), use readily available and inexpensive starting materials, and can prepare a variety of materials under similar reaction conditions.

The efficiency of catalytic materials is influenced by both the chemical nature of the material, and its physical form. For example, in heterogeneous catalysis (e.g., where a solid phase catalysis is exposed to gas and/or liquid phase reactants), a high specific surface can be preferred. Thermal stability is desirable as well.

In one aspect, a catalytic material suitable for high-temperature heterogeneous catalysis includes nanoporous metal oxide nanoparticles. The nanoporous metal oxide nanoparticles can include a nanostructure. The nanostructure can further include a transition metal.

The metal oxide can include a manganese oxide, a magnesium oxide, an aluminum oxide, a silicon oxide, a zinc oxide, a copper oxide, a nickel oxide, a cobalt oxide, an iron oxide, a titanium oxide, yttrium oxide, a zirconium oxide, a niobium oxide, a ruthenium oxide, a rhodium oxide, a palladium oxide, a silver oxide, an indium oxide, a tin oxide, an lanthanum oxide, an iridium oxide, a platinum oxide, a gold oxide, a cerium oxide, a neodymium oxide, a praseodymium oxide, an erbium oxide, a dysprosium oxide, a terbium oxide, a samarium oxide, a lutetium oxide, a gadolinium oxide, a ytterbium oxide, a europium oxide, a holmium oxide, a scandium oxide, or a combination thereof. In one embodiment, the nanoporous metal oxide nanoparticles include ceria.

A measured X-ray diffraction pattern of the nanoporous metal oxide nanoparticles can be substantially unchanged after 60 hours at 400° C. The nanoporous metal oxide nanoparticles can have a BET surface area of greater than 150 m$^2$/g. The nanoporous metal oxide nanoparticles can be substantially free of pores having a width greater than 20 nm.

In another aspect, a method of producing a metal oxide nanoparticle includes contacting an aqueous solution of a metal salt with an oxidant. The oxidant can include hydrogen peroxide. The aqueous solution can include two or more different metal salts. The method can include selecting nanoparticle-forming conditions to form nanoparticles having a predetermined size. The predetermined size can be in the range of 0.5 nm to 250 nm, for example, in the range of 1 nm to 100 nm.

The method can include forming a nanoparticle including a mixed metal oxide having the formula $M^1_x M^2_{(1-x)} O_y$, wherein $M^1$ is a first metal, $M^2$ is a second metal, x represents the mole fraction of $M^1$ of total metal in the metal oxide, and y is such that the bulk metal oxide is charge-neutral. The mixed metal oxide can include oxygen vacancies.

The aqueous solution can include a virus particle having an affinity for an oxide of the metal in the aqueous solution. The virus particle can be an M13 bacteriophage.

In another aspect, a method of making supported catalytic material includes contacting a ceramic support with a virus particle to form a supported virus conjugate, the virus particle having a first surface moiety having affinity for the ceramic support and a second surface moiety having an affinity for a catalytic material; and forming a plurality of catalyst nanoparticles at the surface of the virus particle.

The ceramic support can include silica, α-alumina, β-alumina, γ-alumina, rutile titania, austentite titania, ceria, zirconia, manganese oxide, manganese phosphate, manganese carbonate, zinc oxide, or a combination thereof. Forming the plurality of catalyst nanoparticles can include contacting the supported virus conjugate an aqueous solution of a metal salt with an oxidant. The oxidant can include hydrogen peroxide. The aqueous solution can include two or more different metal salts.

The method can include selecting nanoparticle-forming conditions to form nanoparticles having a predetermined size. The predetermined size is in the range of 0.5 nm to 250 nm, for example, in the range of 1 nm to 100 nm.

The method can include forming a nanoparticle including a mixed metal oxide having the formula $M^1_x M^2_{(1-x)} O_y$, wherein $M^1$ is a first metal, $M^2$ is a second metal, x represents the mole fraction of $M^1$ of total metal in the metal oxide, and y is such that the bulk metal oxide is charge-neutral. The mixed metal oxide can include oxygen vacancies.

The details of one or more embodiments are set forth in the accompanying drawings and the description below. Other features, objects, and advantages will be apparent from the description and drawings, and from the claims.

DETAILED DESCRIPTION

Figure 1:
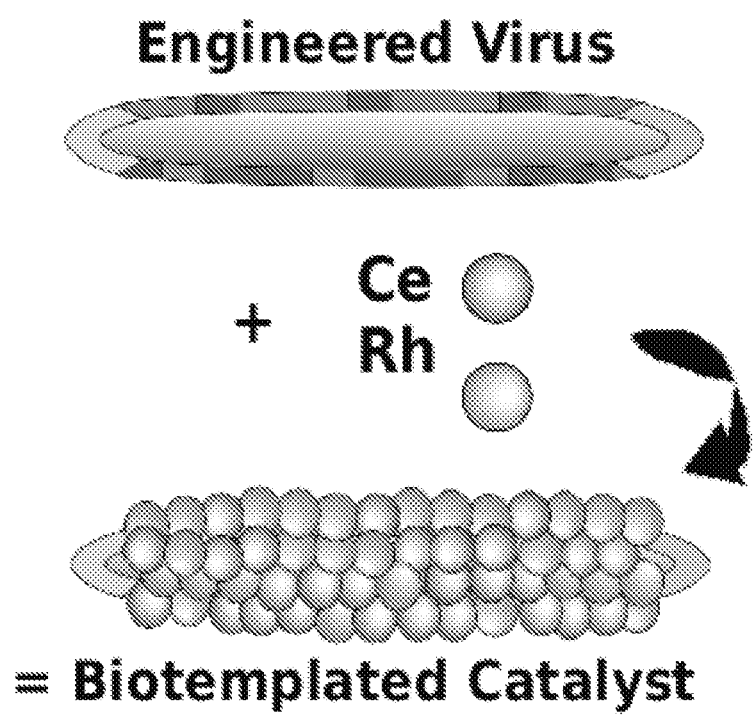
FIG. 1 is a schematic depiction of a viral-templated catalyst.

Catalysts for producing hydrogen, such as transition metal and/or noble metal catalysts, can be prepared by a number of methods. Frequently, the catalyst materials include catalyst particles (e.g., transition metal and/or noble metal particles) and a support. Flame hydrolysis involves hydrolyzing a metal chloride precursor, such as silicon tetrachloride, in a hydrogen/oxygen flame. The hydrogen burns and reacts with oxygen, producing very finely dispersed water molecules in the vapor phase, which then react with the metal chloride to form the corresponding metal oxide nanoparticle and hydrochloric acid. This method is often limited by the availability of a precursor which decomposes upon contact with water.

Another method of catalysis preparation is aerogel synthesis. An aerogel is formed when a liquid solvent in a solid-liquid mixture becomes supercritical and then changes phase to a vapor, exchanging with the environment without any rapid volume changes which might damage the microstructure of the catalyst support. The remaining solid maintains a high level of network connectivity without collapsing and is desirable for its high surface area and porosity.

A mesoporous material may be more interesting as a catalyst than a solid material. Organic functionalization during particle formation can produce the desired pore distribution. The initial particles are formed with organic molecules such as tetraethoxysilane (TEOS) embedded into the structure at room temperature. Subsequent heat treatments drive off the organic molecules, leaving a solid with pores in it defined by the missing organic molecules. A micelle can also be used in this method of catalyst preparation.

Colloidal syntheses are broadly described as syntheses wherein a solid is precipitated from a solvent-soluble precursor into a solvent-insoluble solid nanoparticle mixture. Metallic clusters are formed by reducing metal ions in solution with an agent such as hydrogen or sodium borohydride. The reduced metal ions become zero-valent, losing their electrostatic repulsion, and are able to nucleate nanoparticles of the neutral metallic material. Colloidal syntheses are related to other methods such as the usage of microemulsions, metal complex decomposition, gas phase synthesis, high-gravity reactive precipitation and electrochemical synthesis.

Microwave-assisted synthesis depends on the ability of the material to change local charge configuration and lose energy when this happens. This sort of synthesis can include the production of nanolayer carbide and nitrides on the surface of metal catalysts or the fluidization of metal along with carbon black in argon.

A catalyst can also be synthesized by dendrimer-metal precursor methods. A dendrimer can perform as a nanoreactor, allowing the polymer to grow in a tree-like fashion. The steric hindrance of adjacent chains eventually cause the dendrimer to fold back on itself into a single molecule, where the inside of the dendrimer sphere can be made to attract metal ions in solution. Reduction of the metal-dendrimer complex causes the complex to collapse, forming a nanoparticle inside the dendrimer. The entire dendrimer-metal nanocomposite is deposited onto a porous support and the dendrimer is then removed by either heat treatment of chemical means.

The catalyst particle distribution on a support has significant impact on the final properties of the catalyst. Incipient wetness impregnation or dry impregnation can be used to control the catalyst distribution. Adding an amount of solvent very close to the total pore volume of the support allows all of the solvent to be rapidly taken up into the support. Soaking in the precursor that is dissolved in the same solvent results in a diffusion-limited spread of catalyst material into the support, which causes the catalyst particles to be primarily located at the surface of the support. Drying is also a major influence in the catalyst particle distribution, wherein a constant drying rate results in most of the dissolved precursor forming catalyst species on the external surface of the support. In a second stage called the "first falling-rate period" the rate of drying steadily decreases in a roughly linear fashion, resulting in the dissolved catalyst depositing internal to the support. The "second falling-rate period" where the drying rate falls more gradually until the moisture content is eventually zero, the catalyst particles are deposited at the center of the support.

Ceria ($CeO_2$) is a ceramic with excellent redox properties, and is a common catalyst support used in a variety of reactions. In particular, ceria supported noble metals promote the production of hydrogen from ethanol. Specifically, this reaction is given by

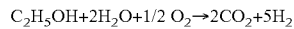

$$C_2H_5OH + 2H_2O + 1/2\ O_2 \rightarrow 2CO_2 + 5H_2$$

See, for example, G. A. Deluga, J. R. Salge, L. D. S. *Science* 2004, 303, 993, which is incorporated by reference in its entirety.

The activity of $CeO_2$ in assisting catalysis is heavily dependent upon the type, size and distribution of oxygen vacancies in the $CeO_2$ fluorite crystal structure. The vacancies can help in the efficiency for reversible oxygen release, which can allow for the formation of more stable states of catalytically active metals adsorbed to the surface. See, for example, F. Esch, S. Fabris, L. Z. *Science* 2005, 309, 752; and A. Trovarelli, Ed.; *Catalysis by Ceria and Related Materials;* Imperial College Press: 2002, each of which is incorporated by reference in its entirety. Much work has been focused on what material is used in conjunction with $CeO_2$ in an effort to eliminate CO and acetaldehyde byproducts, increase efficiency, and decrease operating temperature of the reaction in addition to improving the properties of the $CeO_2$ co-catalyst to enhance catalysis and simplify synthesis. See, for example, J. Kugai, V. Subramani, C. S. *Journal of Catalysis* 2006, 238, 430-440; S. Deshpande, S. Patil, S. K. *Applied Physics Letters* 2005, 87, 133113; F. Zhang, P. Wang, J. K. *Surface Science* 2004, 563, 74-82; J. R. Salge, G. A. Deluga, L. D. S.

Journal of Catalysis 2005, 235, 69-78; C. Zerva, C. J. P. Applied Catalysis B: Environmental 2006, 67, 105-112; H. Idriss, Platinum Metals Rev 2004, 48, 105-115; P.-Y. Sheng, A. Yee, G. A. B. Journal of Catalysis 2002, 208, 393-403; S. J. Morrison, P. Y. Sheng, A. Y. Prepr. Pap.-Am. Chem. Soc., Div. Petr. Chem. 2006, 51, 26; J. Kugai, S. Velu, C. S. Catalysis Letters 2005, 101, 255; M. Fuchs, B. Jenewein, S. P. Applied Catalysis A: General 2005, 294, 279-289; Y. Hirta, A. Harada, X. W. Ceramics International 2005, 31, 1007-1013; P. Dutta, S. Pal, M. S. S. American Chemical Society 2006; M. Romeo, K. Bak, J. E. F. Surface and Interface Analysis 1992, 20, 508-512; D. R. Mullins, S. H. Overbury, D. R. H. Surface Science 1998, 409, 307-319; T. Masui, K. Fujiware, K. M. Chem. Mater. 1997, 9, 2197-2204; M. Hirano, E. K. J. Am. Ceram. Soc. 1996, 79, 777-780; X. Yu, F. Li, X. Y. J. Am. Ceram. Soc. 1999, 83, 964; P. Chen, I. C. J. Am. Ceram. Soc. 1992, 76, 1577-1583; T. Sato, T. Katakura, S. Y. Solid State Ionics 2004, 172, 377-382; A. S. Bodke, S. S. Bharadwaj, L. D. S. Journal of Catalysis 1998, 179, 138-149; and M. Yamashita, S. Yoshida, Y. F. Journal of Materials Science 2001, 37, 683-687, each of which is incorporated by reference in its entirety.

A bimetallic Ni—Rh/$CeO_2$ catalyst can produce less CO and cost less than a similar Rh/$CeO_2$ catalyst. Nickel is a less expensive metal and has a d-orbital very similar in shape to that of rhodium. Therefore, it can facilitate similar reactions, while producing less acetaldehyde than Pt, Pd, Ru or Au. See, for example, J. Kugai, V. Subramani, C. S. Journal of Catalysis 2006, 238, 430-440; and J. Kugai, S. Velu, C. S. Catalysis Letters 2005, 101, 255, each of which is incorporated by reference in its entirety. Kugai found that for reactions taking place around 375° C., nickel itself only achieved 40% conversion of ethanol while 10% Ni and 1% Rh achieved over 92% conversion. Rhodium can improve catalyst performance. See, for example, J. Kugai, V. Subramani, C. S. Journal of Catalysis 2006, 238, 430-440; and J. Kugai, S. Velu, C. S. Catalysis Letters 2005, 101, 255, each of which is incorporated by reference in its entirety.

Synthesis for $CeO_2$ nanocrystals can by accomplished in a variety of ways, such as solid-state reactions, hydrothermal syntheses, homogenous precipitation or two-phase syntheses. See, for example, T. Masui, K. Fujiware, K. M. Chem. Mater. 1997, 9, 2197-2204; M. Hirano, E. K. J. Am. Ceram. Soc. 1996, 79, 777-780; X. Yu, F. Li, X. Y. J. Am. Ceram. Soc. 1999, 83, 964; P. Chen, I. C. J. Am. Ceram. Soc. 1992, 76, 1577-1583; T. Sato, T. Katakura, S. Y. Solid State Ionics 2004, 172, 377-382; and M. Yamashita, S. Yoshida, Y. F. Journal of Materials Science 2001, 37, 683-687, each of which is incorporated by reference in its entirety. The most common commercial method of $CeO_2$ nanocrystal synthesis is wet impregnation, where an existing $CeO_2$ foam is impregnated with rhodium precursors and calcined to produce nanoparticles attached to the $CeO_2$ surface. Another method of nanoparticle synthesis is a biocompatible synthesis based on homogeneous precipitation. See, for example, T. Sato, T. Katakura, S. Y. Solid State Ionics 2004, 172, 377-382; and M. Yamashita, S. Yoshida, Y. F. Journal of Materials Science 2001, 37, 683-687, each of which is incorporated by reference in its entirety.

A wide variety of metal oxide nanoparticles can be synthesized from aqueous solution using hydrogen peroxide as an etchant to prevent particle growth during hydrolysis under basic conditions. The starting materials can include a metal salt, e.g., a metal chloride or metal nitrate. Increased amounts of hydrogen peroxide can decrease particle size. In many cases, the metal oxide was formed immediately with a nanocrystallite size ranging from 1 nm to several tens of nanometers. After synthesis, the particles were dried and heat treated to investigate phase changes and particle growth after calcination.

The reaction produces high quality nanoparticles using hydrogen peroxide concentrations higher than reported in M. Yamashita, S. Yoshida, Y. F. Journal of Materials Science 2001, 37, 683-687, which is incorporated by reference in its entirety. For example, the mole ratio of $H_2O_2$ to metal can be, for example, in the range of 0.001 to 100, in the range of 0.01 to 10, or in the range of 0.1 to 10.

A mixed metal oxide can have the formula $M^1_i M^2_j O_x$. $M^1$ and $M^2$ can each independently be a metal, or in some cases, a semi-metal such as silicon. For example, $M^1$ and $M^2$ can each independently be magnesium, aluminum, silicon, scandium, titanium, manganese, iron, cobalt, nickel, copper, zinc, yttrium, zirconium, niobium, ruthenium, rhodium, palladium, silver, indium, tin, lanthanum, cerium, praseodymium, neodymium, samarium, europium, gadolinium, terbium, dysprosium, holmium, erbium, ytterbium, lutetium, iridium, platinum, gold, or another metal.

In general, the values of i, j, and x are non-negative. In some instances, the value of i, j, or x can be an integer. In some cases, the sum of i and j can be an integer, and the sum of x and y can be an integer. For example, a mixed metal oxide can have the formula $M^1_i M^2_{1-i} O$. In this formula, the sum of i and j is 1, and the value of x is 1.

The metal oxide can include, but is not limited to, a manganese oxide (e.g., $MnO_x$), a magnesium oxide (e.g., MgO), an aluminum oxide (e.g., $Al_2O_3$), a silicon oxide (e.g., $SiO_x$), a zinc oxide (e.g., ZnO), a copper oxide (e.g., CuO or Cu/CuO), a nickel oxide (e.g., NiO or Ni/NiO), a cobalt oxide (e.g., $Co_3O_4$ or Co/$Co_3O_4$), an iron oxide (e.g., $Fe_2O_3$ as hematite or maghemite, or $Fe_3O_4$ as magnetite), a titanium oxide, yttrium oxide, a zirconium oxide, a niobium oxide, a ruthenium oxide, a rhodium oxide, a palladium oxide, a silver oxide, an indium oxide, a tin oxide, an lanthanum oxide, an iridium oxide, a platinum oxide, a gold oxide, a cerium oxide, a neodymium oxide, a praseodymium oxide, an erbium oxide, a dysprosium oxide, a terbium oxide, a samarium oxide, a lutetium oxide, a gadolinium oxide, a ytterbium oxide, a europium oxide, a holmium oxide, a scandium oxide, or a combination thereof.

The nanostructure of the Ni—Rh/$CeO_2$ system can have a substantial effect on the final product quality. Preferably, the nanostructure of the catalyst has rhodium atoms (e.g., a majority of all rhodium atoms) near a $CeO_2$ oxygen vacancy, rhodium atoms at the surface of the structure (and therefore accessible to reactants), a high surface area/volume ratio; and rhodium atoms physically isolated from other rhodium atoms. These structural features can enhance the specific activity of the catalyst. See, for example, J. R. Salge, G. A. Deluga, L. D. S. Journal of Catalysis 2005, 235, 69-78, which is incorporated by reference in its entirety.

M13 bacteriophage can serve as a template for nanoparticle growth. See, for example, Ki Tae Nam, Dong-Wan Kim, P. J. Y. Science 2006, 312, 885, which is incorporated by reference in its entirety. Protein engineering techniques (e.g., phage display) can produce a virus that has a protein coat with binding affinity for a desired target material, e.g., an inorganic material such as a metal or a metal oxide. The protein coat protein can have a metal binding motif, which, for example, can be a negatively charged motif, e.g., tetraglutamate or a peptide with a binding affinity to a metal. For example, the motif can be a 12-amino acid peptide with a high affinity for Au. In one example, engineered M13 virus particles allowed control of the assembly of nanowires of $Co_3O_4$ with a small percentage of Au dopant. Id.

While M13 bacteriophage can have a major coat protein with a motif that binds specific metals, the motif can also block binding of other metals. For example, tetraglutamate can interact with various metal ions but blocks interaction with Au due to electrostatic repulsion. See, for example, Ki Tae Nam, Dong-Wan Kim, P. J. Y. *Science* 2006, 312, 885, which is incorporated by reference in its entirety. M13 bacteriophage with a major coat protein specific to $CeO_2$ and a small percentage of peptides specific for rhodium alone can serve as a template for $CeO_2$ nanowire can be created with a spatially interspersed rhodium nanocrystals. FIG. 1 depicts a nanostructure exhibiting desirable properties. The virus with randomly expressed proteins capable of nucleating either $CeO_2$ or rhodium metal are grown first, and then subsequently exposed to precursors of $CeO_2$ and rhodium to produce a protein templated catalyst.

The nanostructured system increases the fraction of rhodium atoms that are touching a Ce atom, increasing the probability that a rhodium —$CeO_2$ vacancy will occur and reducing the amount of inactive rhodium. They can reduce the amount of rhodium that is required for the system, thereby decreasing cost. Next, the M13 bacteriophage acts as a scaffold with a thin layer (e.g., a monolayer) of nanocrystals at the surface, allowing the majority of rhodium atoms to be near the surface and a very small amount of rhodium atoms to be trapped. This can further reduce the amount of rhodium needed for the system since the inactive rhodium is decreased. Third, the resultant nanorod can have a high surface area to volume ratio. The final pore size distribution may also have a substantial impact on the final product distribution and catalyst activity. Finally, the random locations of the metal-binding motifs on the M13 viral coat can favor physical separation of adjacent rhodium nanocrystals compared to that given by wet impregnation or co-precipitation. When physically separated, rhodium nanocrystals are unlikely to sinter together due to hotspots during catalysis. The physical separation can be enhanced by the 1-D nature of a nanowire.

In general, smaller ceria nanoparticles can be preferable, due to their high surface area to volume ratio and oxygen vacancy concentration. The oxygen vacancy concentration coupled with the inherently high oxygen diffusion rate in the fluorite structure of ceria creates an excellent surface for absorbing and releasing oxygen as needed to support redox catalysts. See J. Kugai, V. Subramani, C. S. *Journal of Catalysis* 2006, 238, 430-440; S. Deshpande, S. Patil, S. K. *Applied Physics Letters* 2005, 87, 133113; F. Zhang, P. Wang, J. K. *Surface Science* 2004, 563, 74-82. C. Zerva, C. J. P. *Applied Catalysis B: Environmental* 2006, 67, 105-112; F. Esch, S. Fabris, L. Z. *Science* 2005, 309, 752; A. Trovarelli, Ed.; *Catalysis by Ceria and Related Materials;* Imperial College Press: 2002; Q. Fu, H. Saltsburg, M. F.-S. *Science* 2003, 301, 935; and Z. Liu, S. Jenkins, D. K. *Physical Review Letters* 2005, 94, 196102, each of which is incorporated by reference in its entirety. Smaller particles can have a higher activation energy to sintering which explains why it appears to have a large temperature response, suggesting that for different operating temperatures, different initial sized nanoparticles can provide a high long-term stability. Forming the nanowires with a thin coat can limit the sintering to occur in two dimensions. This can result in resistance to particle coarsening, which in most systems, can cause a gradual degradation of the catalyst.

Figure 8:
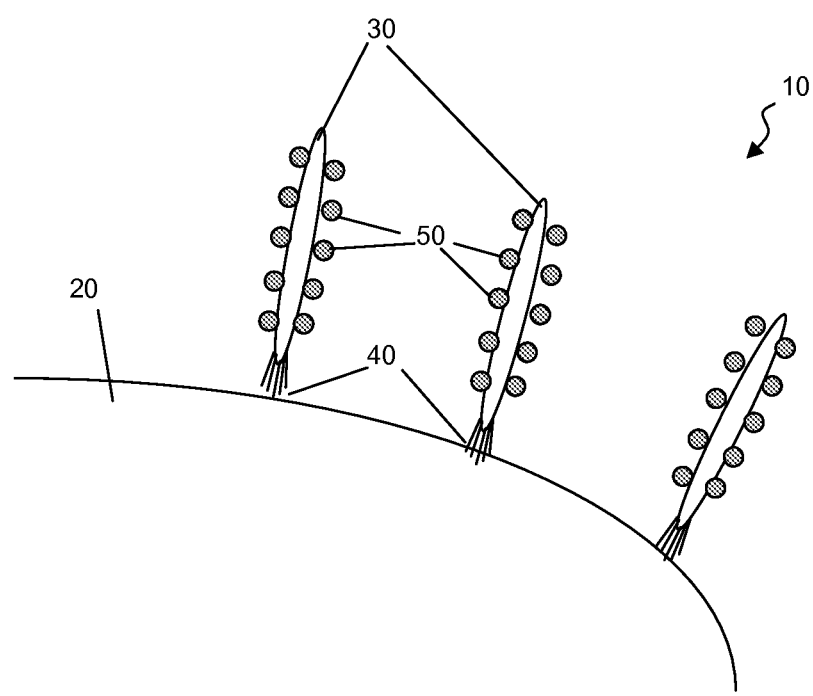
FIG. 8 is a schematic depiction of a virus-templated, supported material.

M13 bacteriophage can be engineered to bind to different materials at different sites, by introducing different affinity motifs in the major and minor coat proteins. FIG. 8 illustrates a composite material 10 include a ceramic support 20. Bacteriophage particles 30 are bound to the surface of support 20 by coat proteins 40 selected to have affinity for ceramic material of support 20. Catalytic metal oxide nanoparticles 50 are bound to virus particles 30 by coat proteins selected to have affinity for the metal oxide. Composite material 10 provides a large quantity (e.g., a high surface area) of catalytic metal oxide nanoparticles 50. Because the nanoparticles are bound to support 20, the composite material can be handled more conveniently, for example in preparing a catalytic reactor.

Example 1

Figure 2A:
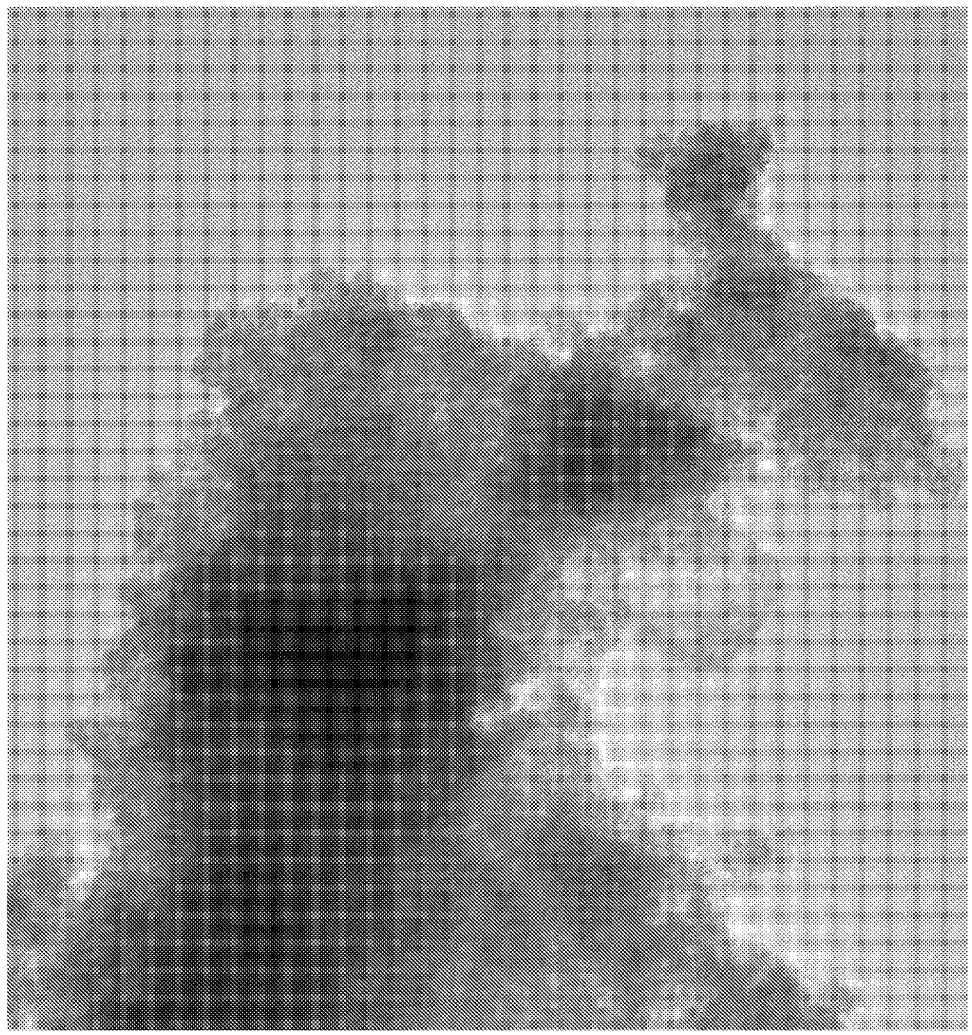
FIG. 2A is a TEM image of $CeO_2$ nanoparticles produced in the absence of phage particles.
Figure 2B:
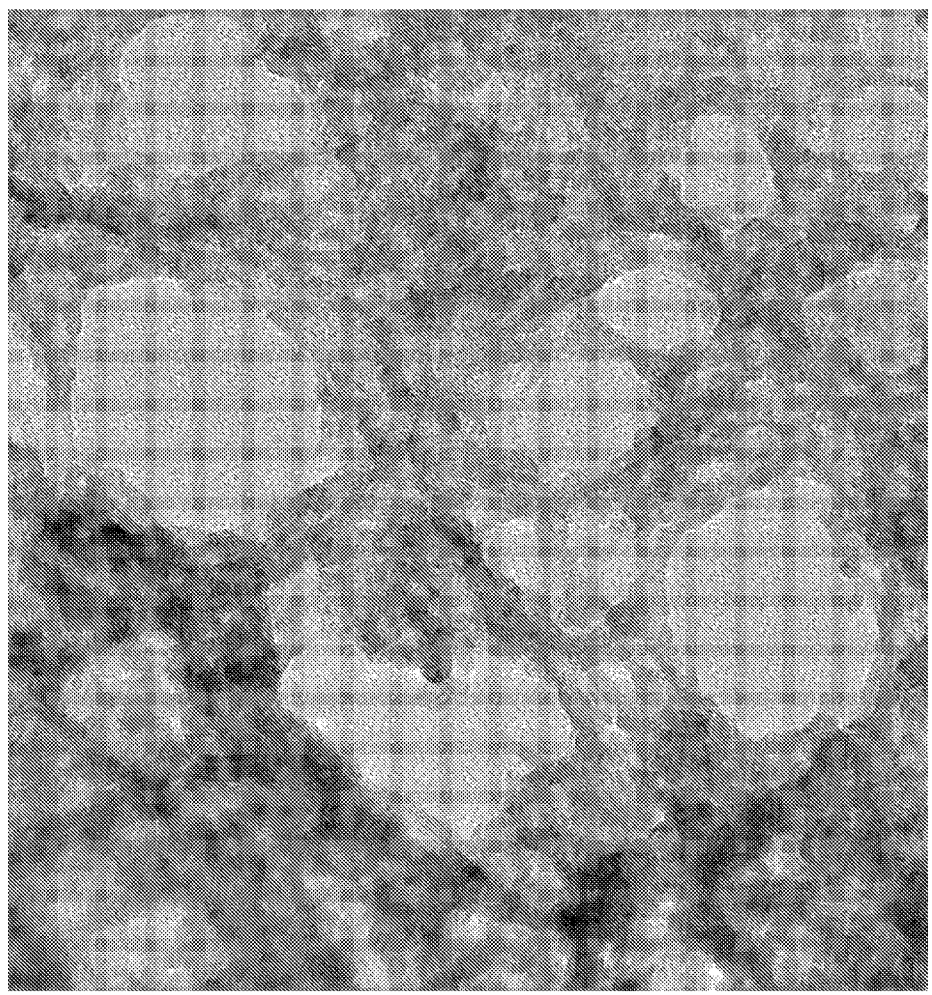
FIG. 2B is a TEM image of a $CeO_2$ nanoparticles produced in the presence of phage particles.

Previously, an E4 strain of M13 phage that expresses four glutamic acids (EEEE) on the surface of the major coat was developed. See, for example, Ki Tae Nam, Dong-Wan Kim, P. J. Y. *Science* 2006, 312, 885, which is incorporated by reference in its entirety. The E4 strain typically mutates to an E3 strain which includes AEEE instead of EEEE after a few amplications. To form $CeO_2$ nanowires on an E3 phage, the E3 phage with a metal-binding motif on a coat protein is amplified to a concentration of $\sim 10^{14}$ mL$^{-1}$. 500 µL of $CeCl_3$ was incubated for 10 minutes with 100 µL of the E3 phage with between $10^5$ and $10^{12}$ total phage particles added from the amplified solution. 50 µL of NaOH simultaneously with 1 µL 0.3 wt % $H_2O_2$ was added to the mixture and immediately vortexed. The resultant nanowires were put on a TEM grid for imaging. FIG. 2A shows a TEM image of the system with no virus. FIG. 2B shows a TEM image of $CeO_2$ nanowires produced with $10^{12}$ phage particles in solution. In several places, the phage can be identified by the thin hollow while line (indicated by arrows) showing the core of the phage where no $CeO_2$ is present.

Figure 3:
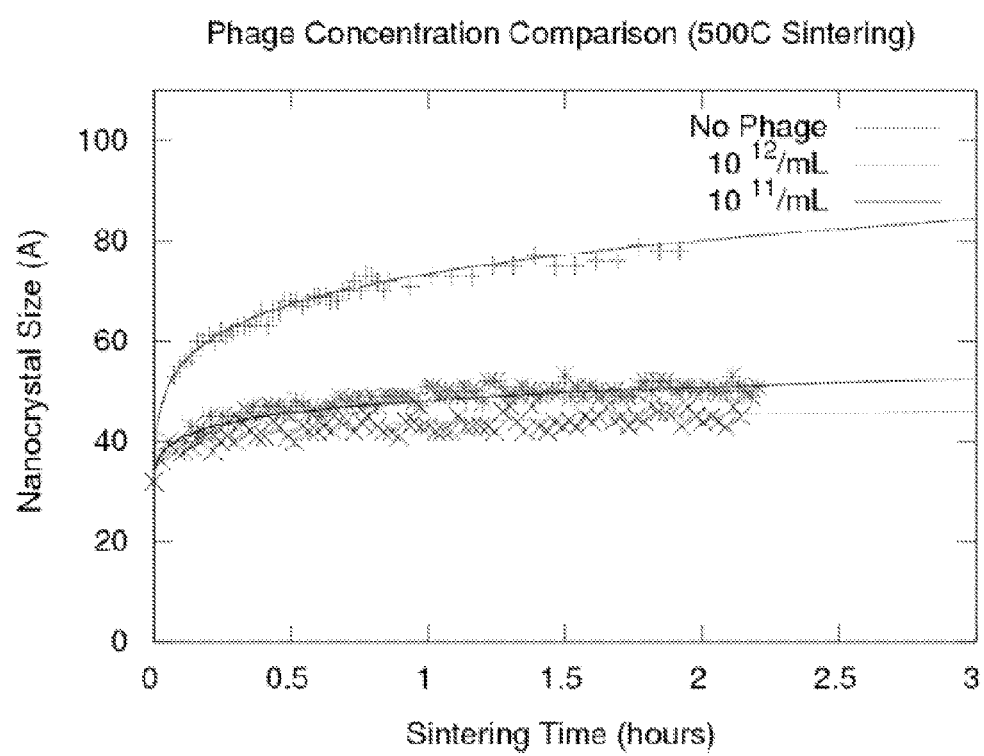
FIG. 3 is a graph illustrating the coarsening behavior at 500° C. of nanoparticles compared to nanowires templated with phage.

The addition of phage to the $CeO_2$ synthesis resulted in highly enhanced thermal stability wherein the nanowires of $CeO_2$ have essentially identical nanocrystallinity before and after 60 hours of heat treatment at 400° C. FIG. 3 shows the difference in coarsening behavior, as measured by X-ray diffraction, at 500° C. sintering conditions between nanoparticles and nanowires templated with phage as a function of phage concentration. The addition of phage also suppresses growth from the $8^{th}$ order behavior seen in nanoparticles alone to growth orders higher than 20 in 500° C. sintering conditions.

Example 2

Rh—Ni/$CeO_2$ nanoparticles were formed by co-precipitating $RhCl_3$, $NiCl_2$ and $CeCl_3$ using NaOH and $H_2O_2$ as pH modifier and oxidizer, respectively, to form $Rh_2O_3$, NiO and $CeO_2$, which are the catalytically active phases of each material. A solution containing 1% $RhCl_3$, 5% $NiCl_2$ and 94% $CeCl_3$ (percent of total metal ions) was made and precipitated by adding NaOH and $H_2O_2$ in the same way as was done for the $CeO_2$ nanoparticles in Example 1, at a 10× $H_2O_2$ concentration (i.e., 10-fold more concentrated than reported in Yamashita and Yoshita). The solution was dried in the air and then heat treated at 200° C. Nanoparticles of $Rh_2O_3$ were formed after heat treatment at 400° C. The nanoparticles were approximately 4.0 nm and were black. Similarly, nanoparticles of NiO were formed after heat treatment at 400° C. The nanoparticles were approximately 9.6 nm and went from a bluish-green powder to a dark black after heat treatment.

To verify that the ratio of metal atoms in the final particles was roughly the same as the ratio of the precursor mixture, TEM images of a final dried nanoparticle sample made with 5% $RhCl_3$ and 95% $CeCl_3$ were recorded. Energy dispersive spectroscopy showed that 88% Ce, 5% Rh, and 7% Cl, which is approximately in line with the input precursors. The nanoparticle powder had an average crystalline diameter of about 3.0 nm as measured by X-ray diffraction, and a BET surface area of 152 m²/g with a pore volume of 0.113 cm³/g.

Figure 4A:
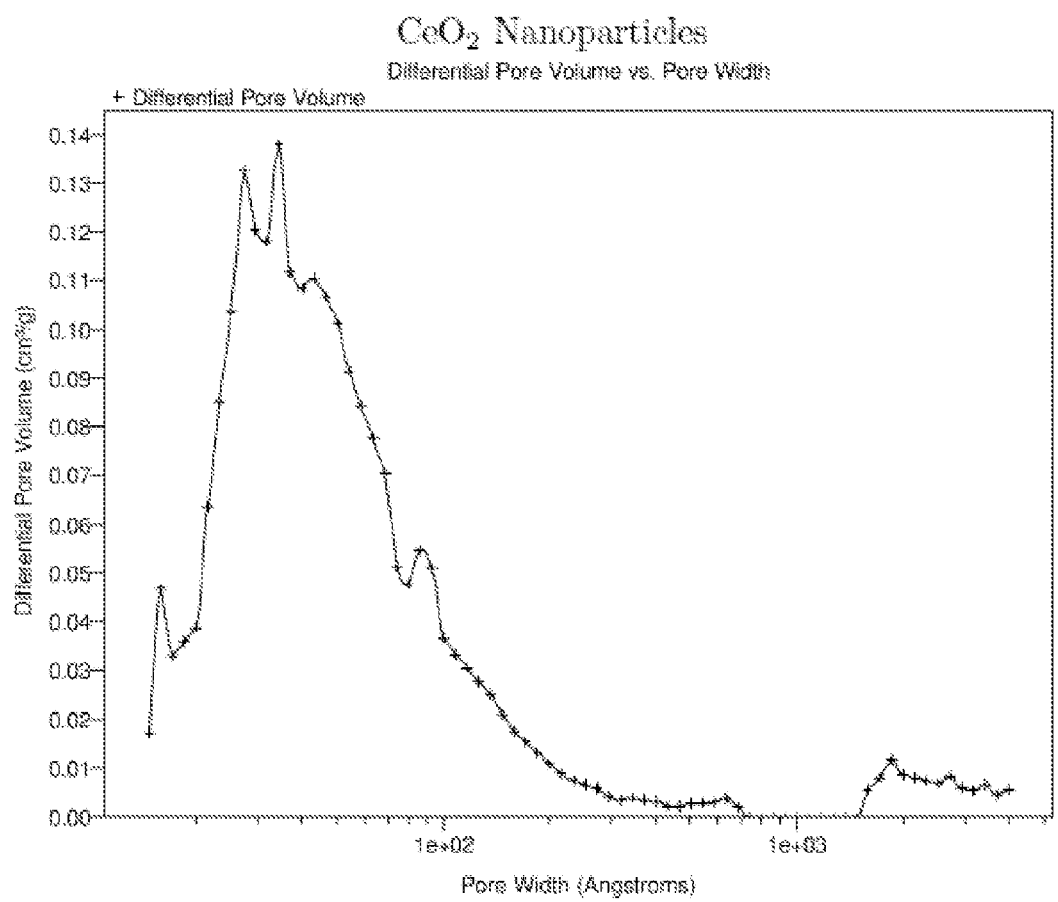
FIGS. 4A-B are graphs illustrating the pore size distribution of $CeO_2$ nanoparticles prepared under different conditions.
Figure 4B:
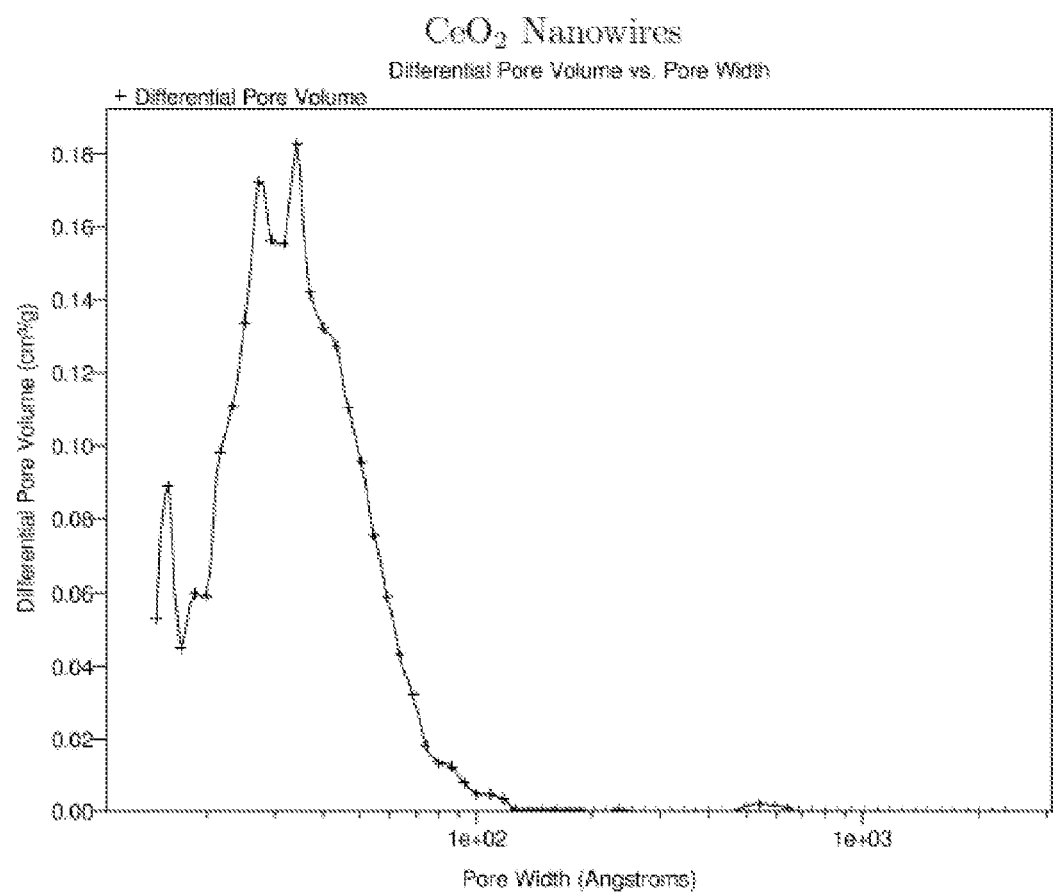

Nanowires were then formed by simple co-precipitation by using a solution with 1% $RhCl_3$, 5% $NiCl_2$ and 94% $CeCl_3$. E3 phage was added to get an concentration of $10^{11}$ phage particles per mL with 100 mM total concentration of metal salt precursors. The resulting nanowire powder had an average crystallite size of 3.5 nm, and a BET surface area of 180 m²/g with a pore volume of 0.121 cm³/g. FIG. 4A shows the pore distribution calculated using a density functional theory model of the $CeO_2$ nanoparticles formed in the absence of virus particles. FIG. 4B show the pore distribution the $CeO_2$ nanowires formed by co-precipitation with E3. The nanowire powder had an average crystalline size of 3.5 nm, and a BET surface area of 180 m²/g with a pore volume of 0.121 cm³/g. The nanoparticles have less total area contained in the pores while the nanowires also have a narrower pore size.

Figure 5:
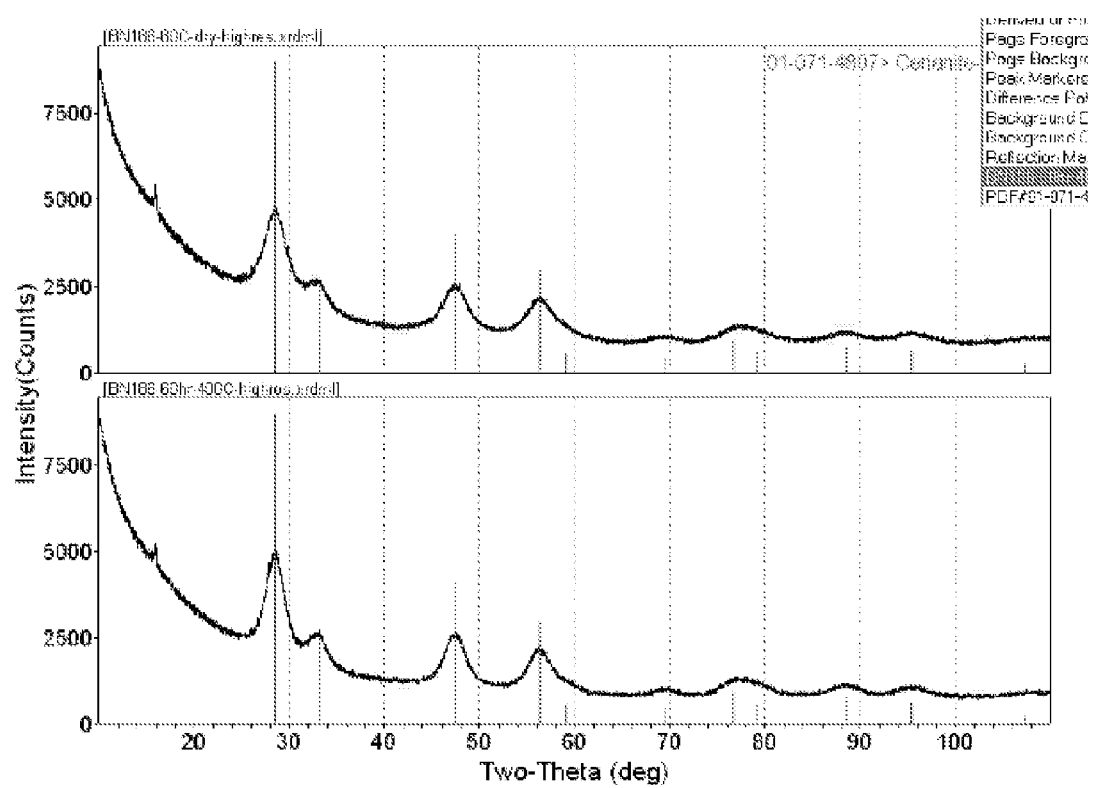
FIG. 5 is an XRD measurement of 5% Ni-1% Rh on $CeO_2$ nanowires after 60 hours of heat treatment at 400° C.

FIG. 5 shows that after the nanowire powder was heat treated at 400° C. for 60 hours, the average change in nanocrystal size was less than 0.3 nm and no precipitation of minor phases was observed. In the nanoparticle sample, however, there was precipitation. This suggests good integration of rhodium and nickel into the nanowire structure, as opposed to discrete clusters of rhodium and nickel separate from the nanowires.

Figure 6:
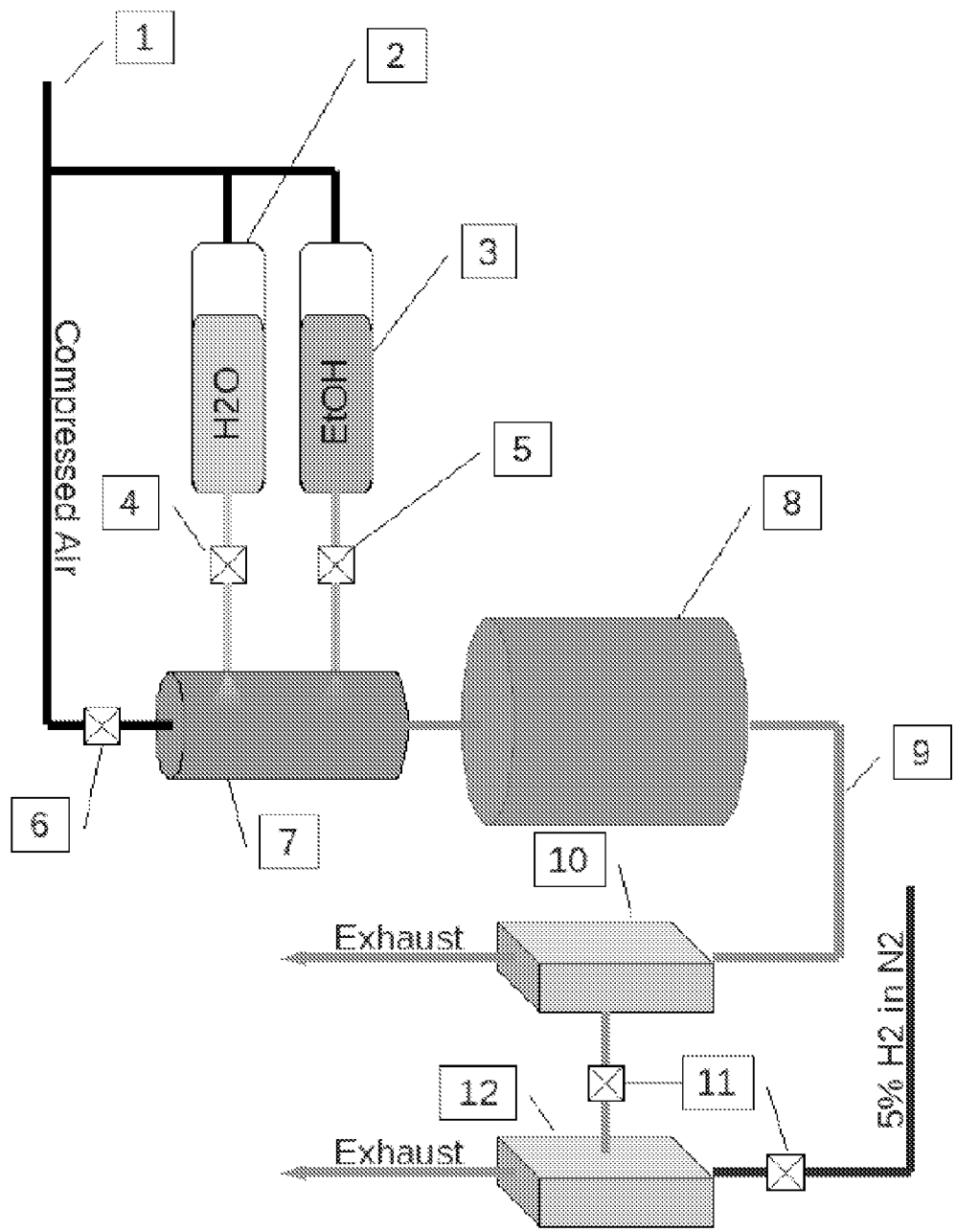
FIG. 6 is a schematic depiction of a test reactor to monitor catalysis.

The nanowires and nanoparticles were then tested for catalytic activity in converting ethanol to hydrogen and $CO_2$. FIG. 6 shows a schematic overview of the test reactor. After the system was calibrated with water, ethanol, and different gases, air was flowed through the FTIR system 10 without ethanol or water being injected into the manifold 7 at each temperature. Then, the liquid water tank 2 with flow controller 4 and liquid ethanol tank 3 with flow controller 5 allowed water and ethanol, respectively to be heated in heating manifold 7. Gas calibrations were also done with gas flow controller 6. All tubing 9 is 316 stainless steel and in most places wrapped with heat rope and layers of insulation to prevent condensation of water inside the tubing. The catalyst powders were heated from the outside by use of tube furnace 8. The powders were held on a filter in tube furnace 8. A set of dual miniature solenoid valves 11 were allowed to sample the output stream after passing though the FTIR. Hydrogen sensor 12 is attached to a computer for measurements. Finally, $CO_2$, $CH_4$, CO, $CH_3COH$ and $H_2$ concentrations were calculated and normalized so that they sum 100% to account for fluctuations in water concentrations.

Figure 7A:
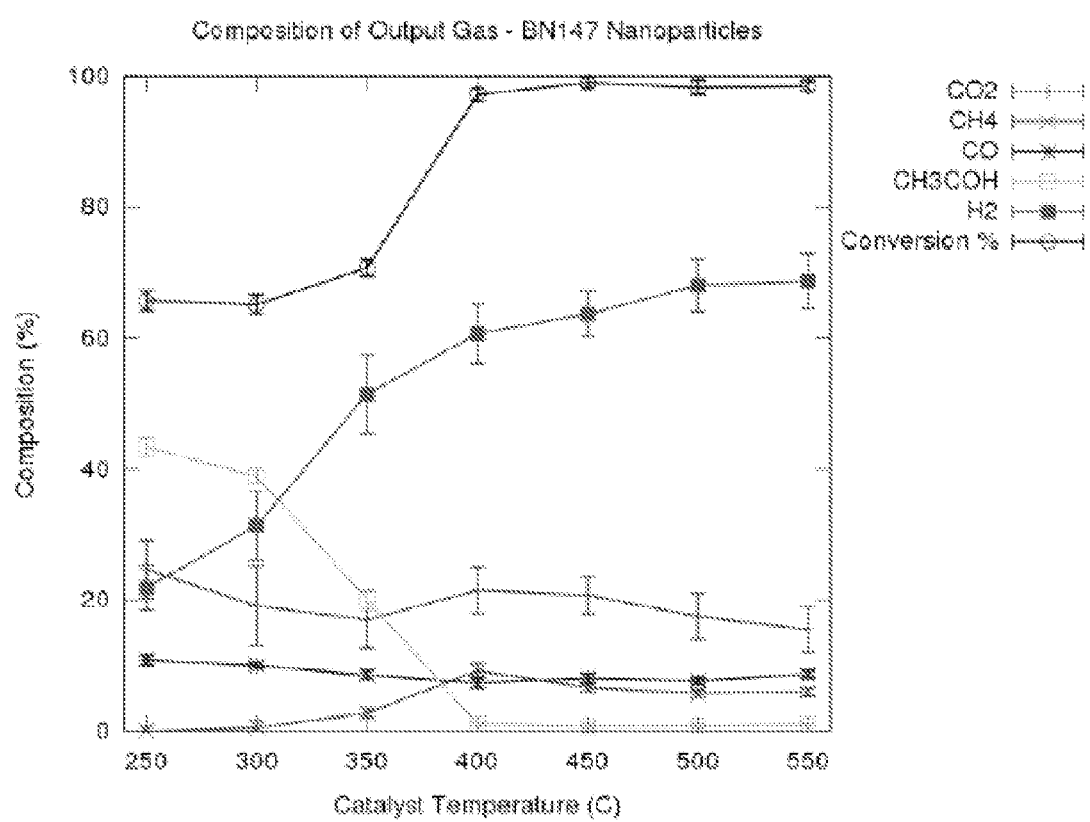
FIGS. 7A-7B are graphs depicting the composition of gases produced in a catalytic reactor under varying conditions.
Figure 7B:
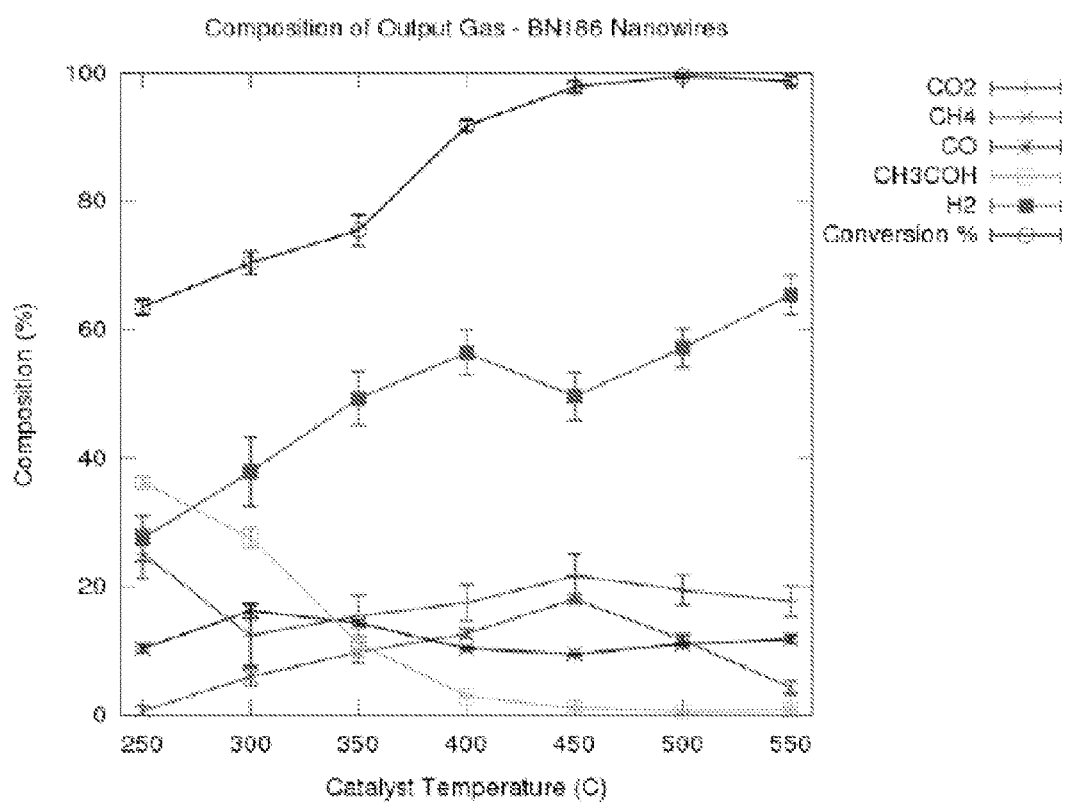

FIGS. 7A and 7B provide a comparison of gas output composition as a function of temperature for co-precipitated nanoparticles (FIG. 7A) and for nanowires templated on E3 (FIG. 7B). Total flow rate was 10.882 mmol/min, and the amount of catalyst in both cases was 500 mg (~2.905 mmol assuming $CeO_2$), for a GHSV of 32.7 hr⁻¹.

Example 3

Ni—Rh@CeO2 was formed by using the oxidation and hydrolysis of $CeCl_3$ with $RhCl_3$ and $NiCl_2$ in aqueous solution. Water (120 mL) was either used as-is or by diluting E3M13 phage (AEEE expressed on the pVIII major coat protein) to a concentration of approximately $10^{12}$/mL by adding ~10-100 µL of phage solution at a spectroscopically measured approximate concentration of ~$10^{15}$/mL. The diluted phage or phage-free water was mixed for 30 min in a 500 mL Ehrlenmyer flask at room temperature to ensure good dispersion. For comparison of different phage concentrations, the concentrated phage was decreased in concentration serially by factors of 10 to achieve an internally accurate phage ratio.

After mixing, 30 mL of 1 M metal chloride solution containing $RhCl_3$ (anhydrous, 99.9% Alfa Aesar), $NiCl_2$ (anhydrous, 98% Alfa Aesar), and $CeCl_3$ (heptahydrate, 99% Acros Organics) in a 1:10:89 molar ratio ($RhCl_3/NiCl_2/CeCl_3$) was added to either diluted M13 phage or phage-free water and allowed to equilibrate over 30 min at room temperature at 650 rpm.

After equilibration, nanoparticles were nucleated by the rapid addition of a mixture of 30 mL of 3 M NaOH (99%, Mallinckrodt Chemicals) and 60 µL of 30 wt % $H_2O_2$ (29.0-32.0% Reagent ACS, VWR). Immediately after addition, the solution turned dark brown-red and solids formed with gas evolution. The solution was stirred at 650 rpm for 30 min to allow the reaction to go to completion. After completion, the suspension was precipitated using centrifugation and the supernatant discarded. The precipitate was redissolved in water to wash residual NaCl and NaOH from the powder and recentrifuged for a total of three washings. After washing, the precipitate was set out at room temperature in a Petri dish in air until dry. After drying, the powders were finely ground and heat treated at 400° C. for 2 h until the final powder was produced. TGA on similar samples show that 350° C. was a sufficiently high temperature to remove nearly all of the carbon from the sample.

Catalyst powders were loaded in an unpacked layer in a 316 stainless steel chamber (Swagelok Part SS-4F-05 In-Line Particulate Filter) where the filter element was replaced with a 12 mm fine porosity fritted borosilicate disk (ChemGlass Part CG-201-05) to a typical depth of ~5 mm in the case of 1000 mg samples. In the case of very small samples (100 mg), a thin layer was placed on the borosilicate disk by gently tapping the catalyst chamber until the disk was no longer visible. The disk was replaced after each test, and the gas hourly space velocity (GHSV) was changed by using varying amounts of catalyst powder while keeping the absolute flow rate constant to eliminate variations due to reactor activity or pressure changes due to increased flow rate. The GHSV was estimated by using an assumed catalyst density of 1 g/mL, and the gas volume was converted to a standard volume at 298 K and 1 atm.

The entire catalyst chamber was heated to the desired reaction temperature using a tube furnace (HTF55122A 1-Zone 1200° C. furnace with CC58114COMA-1 Digital Controller, Thermo Fisher Scientific). The preheating chamber was made out of 1 in. diameter 316 stainless steel tubing with custom machined Swagelok fittings to allow for the fuel injector (16 lb/h disc high-Z fuel injector, Racetronix Model 621040) to inject liquid directly into the preheating chamber. The fuel injector temperature was measured using a thermocouple on the Swagelok fitting and heated with heat tape (McMASTER-CARR Part 4550T12) wrapped around the preheating chamber outside of the furnace controlled using a temperature controller (Omega CNI3233-C24) to 120° C.

The air mass flow controller in all experiments was set at 14 mL/min (2.94 mL/min $O_2$), argon flow controller was set at approximately 100 mL/min, and ethanol was injected with the fuel injector using a 1.157 ms pulse every 2 s at 50 psi and 24 VDC. This pulse length was equivalent to 2.91 µL per pulse based on fuel injector calibrations done by injecting known pulse lengths and counting the number of pulses required to inject 10 mL of liquid. The total molar ratio at STP for these amounts is 1.7:1:10:11 (air/EtOH/water/argon) with a total flow rate of roughly 200 mL/min.

The internal temperature of the preheating chamber was monitored using a temperature probe placed just above the catalyst bed with a temperature controller (Omega CNI3233-C24), and the temperature of the input gas was typically close to the temperature of the furnace. The preheating chamber had two ⅛ in. Swagelok fittings to allow for argon and air to be added to the mixture using a mass flow controller (Alicat MC-1 SLPM-D/5 M 0-1 SLPM) for the air and a manual flow controller for the argon backflow gas.

Below the reactor bed, the gas mixture was allowed to equilibrate in a 150 mL double-ended 316 stainless steel sample cylinder (Swagelok Part 316 L-50DF4-150) placed inside the furnace to prevent condensation. This volume represents a time to equilibration of roughly 7.5 min assuming approximately 10 times the replacement time to fully equilibrate at a new composition. The output gas was carried through a 0.5 μm 316 stainless steel filter (Swagelok Part SS-4FWS-05) to the GC via ⅛ in. 316 stainless steel tubing sheathed in ¼ in. copper tubing wrapped with high-temperature heat rope (McMASTERCARR Part 3641K26) and using a temperature controller (Omega CNI3233-C24) set to 120° C. to prevent condensation. The tubing entered the GC through a valve with a 250 μL sample loop held at 150° C. after passing through another 0.5 μm 316 stainless steel filter (Swagelok Part SS-2F-05) to prevent clogs in the GC valves. The equilibrated composition was fed continuously through an Agilent 7890A gas chromatograph, where the sample loop was switched onto the column every 35 min.

The sample was measured by the GC initially configured to Agilent Configuration 7890-0047, which meets ASTM D3612A specifications, with modified inlet temperature to avoid water condensation (150° C.) and lengthened total run time to avoid overlap with any present higher molecular weight hydrocarbons. This configuration uses an argon background with a flame ionization detector (FID) and a nickel methanizing catalyst for the detection of hydrocarbons, $CO_2$, and CO, and a thermal conductivity detector (TCD) for the detection of $H_2$, $O_2$, $N_2$, and $H_2O$.

The results were calibrated using custom mixed gas calibrations provided by Airgas. Hydrogen was calibrated to 6.063% $H_2$ in argon, and 10 samples had a standard deviation of 0.051%. Carbon monoxide was calibrated to 9.568% CO in $N_2$, and 10 samples had a standard deviation of 0.023%. Methane was calibrated to 20.000% $CH_4$ in $N_2$, and 10 samples had a standard deviation of 0.035%. $CO_2$, $O_2$, and $N_2$ were calibrated using dry air. Water was calibrated by using a target 1:1 ratio injected and vaporized in the reactor with air for 10 measurements with the total sum of products forced to 100%. This closed to a water amount of 47.85% with a standard deviation of 0.76% over 10 samples. Ethanol and acetaldehyde were calibrated by mixing with water to a known molar ratio and calibrating by liquid injection of the diluted sample and comparison to the water amount measured to avoid any homogeneous decomposition arising from flow through the reactor. Sample amounts were calculated from calibrations by measuring the area of the peaks and comparing to the areas of peaks at the calibration composition.

Bar graphs showing product distribution and activity were made by scaling the product distribution such that the total height is the total ethanol conversion while the internal product distribution is represented by the relative size of each component. Error bars were calculated by using the standard deviation of each scaled component amount over the 36 measurements, scaled proportionally by the amount each component is scaled. For each component, this error is estimated as $$\sigma_A^{total} = \sqrt{(\sigma_A F)^2 + (\sigma_F A)^2}$$

where A is the fraction of total products for component A, $\sigma_A$ is the standard deviation in the fraction of total products for component A over the 36 measurements, F is the total ethanol conversion percent, and $\sigma_F$ is the standard deviation of the ethanol conversion percent over the 36 measurements.

Homogeneous decomposition was measured by injecting a 1:10 ethanol/water mixture into the reactor with no catalyst present. At 300° C., homogeneous decomposition showed 18.5% conversion of ethanol to acetaldehyde estimated as the ratio of measured acetaldehyde to the sum of the measured acetaldehyde and measured ethanol. Essentially no $H_2$ or $CH_4$ were measured. Catalysis is likely taking place in the tubing, which contains nickel, and on the stainless steel filter elements, so by placing the catalyst powder as early as possible in the flow path, subsequent dehydrogenation is limited.

XRD crystallite sizes were determined by using the in situ furnace attachment for the PANalytical X'Pert PRO diffractometer with the X'Celerator detector and a Cu Kα source. Spectra were analyzed using Jade software, and the peak width was used to calculate average nanocrystallite size by fitting each peak to a Pearson-VII curve with no skewness.

TEM images were taken using a JEOL 2010 electron microscope at 200 keV. EDS was done using a GATAN detector in STEM mode on a JEOL 2010F with a field emission gun. BET data were collected using the Micromeritics ASAP 2020, and pore size distributions were estimated by using Micromeritics DFT Plus software with the original density functional theory model, with $N_2$ at 77 K on carbon with slit pores.

Overall conversion was calculated as the ratio of ethanol consumed to ethanol injected, estimated using the amount of nitrogen detected as an internal standard along with the known molar ratio of nitrogen to ethanol at the inlet. The ratio of $N_2$ to ethanol at the inlet is 1.33:1 based on the total flow rate of air and ethanol, so the conversion is calculated as $$conv\ \% = 1 - \frac{[EtOH]}{[N_2]/1.33}$$

where [EtOH] is the measured molar amount of ethanol in the output stream and [$N_2$] is the measured molar amount of nitrogen in the output stream.

Composition was calculated as the ratio of a given product to the total sum of products including only $CO_2$, $H_2$, CO, $CH_4$, and acetaldehyde $$X\ \% = \frac{[X]}{\sum_i [i]}$$

where X % is the calculated fraction for product X, and [X] is the molar amount of product X. The fractions were then scaled down by $$\overline{X}\% = X\% \times Conv\ \%$$

for easier display in a stacked bar chart. Water was consumed during this reaction, so the molar ratio of hydrogen to carbon could vary depending on the amount of steam reforming that occurred. In experiments, the actual measured H/C ratio varied quite a bit, from as low as ~3:1 at low temperatures to ~6:1 at high temperatures.

Gas chromatography was used to take 36 samples over 21 h at temperatures ranging from 200 to 400° C. using 1000 mg of either M13-templated or untemplated catalyst (~12,000 h⁻¹ GHSV). In both cases, complete conversion occurred at 300° C. with approximately 60% $H_2$, less than 0.5% CO, and no acetaldehyde in the product distribution. The best results in literature under similar conditions used Rh—Ni@$CeO_2$ and Co@$CeO_2$ catalysts with 90%+ethanol conversion, but with 8-10% CO and 2-7% acetaldehyde in the product distribution, making the new catalysts preferable for use in fuel cells, where CO can act as a poison. See, e.g., Kugai, J.; et al. *J. Catal.* 2006, 238, 430-440; Kugai, J.; et al. *Catal. Lett.* 2005, 101, 255; and Llorca, J.; et al. *J. Catal.* 2002, 209, 306-317, each of which is incorporated by reference in its entirety. The untemplated and M13-templated catalyst showed similar product distributions under these conditions.

Increasing the GHSV from 12,000 to 36,000 h⁻¹ at 300° C. by decreasing the amount of catalyst at the same input flow rate resulted in some decrease in activity accompanied by more CO and acetaldehyde with less $CH_4$, but ethanol conversion remained above 95%. Both catalysts showed similar product distributions. Samples without rhodium were also tested. In the nickel-only samples, the activity of the 10% Ni@$CeO_2$ catalyst was particularly notable in that nickel alone on $CeO_2$ achieved 100% ethanol conversion with an excellent product distribution, out performing the mixed rhodium-nickel catalysts at 400° C. primarily due to the decrease in the amount of methane seen (8 to 2%) in the product distribution. Performance dropped off quickly as temperature was decreased, demonstrating that the rhodium was necessary for low temperature conversion. Conversion over the nickel only catalyst was steady over 20 h. The nickel-only catalyst performed more poorly when templated onto M13 than when left untemplated. This decreased performance suggested that impurities remaining from the biological material were contaminating the catalyst and reducing activity. For example, residual carbon, sulfur, phosphorus, or other biologically common elements may reduce the activity of the supported catalyst. This deactivation was not seen in the catalyst made with added rhodium.

In order to investigate the long-term thermal stability, catalysts were also tested at 450° C. and 120,000 h⁻¹ GHSV by decreasing the amount of catalyst to 100 mg. Under these conditions, M13-templated catalysts showed near complete conversion (99-100% ethanol conversion) and steady performance over 52 h with 70% $H_2$ and about 5% $CH_4$, 3% CO, and 1% acetaldehyde in the product stream. At similar flow rates and temperatures, Rh—Ni@$CeO_2$ catalysts reported in literature showed complete conversion, but with 50% $H_2$ and 19% $CH_4$, while Co@$CeO_2$ catalysts produced 70% $H_2$, 9% $CH_4$, and 2% acetaldehyde. See, e.g., Kugai, J.; et al. *J. Catal.* 2006, 238, 430-440; Kugai, J.; et al. *Catal. Lett.* 2005, 101, 255; and Llorca, J.; et al. *J. Catal.* 2002, 209, 306-317; Wang, H. et al. *Catal. Today* 2007, 129, 305-312, each of which is incorporated by reference in its entirety.

Figure 9:
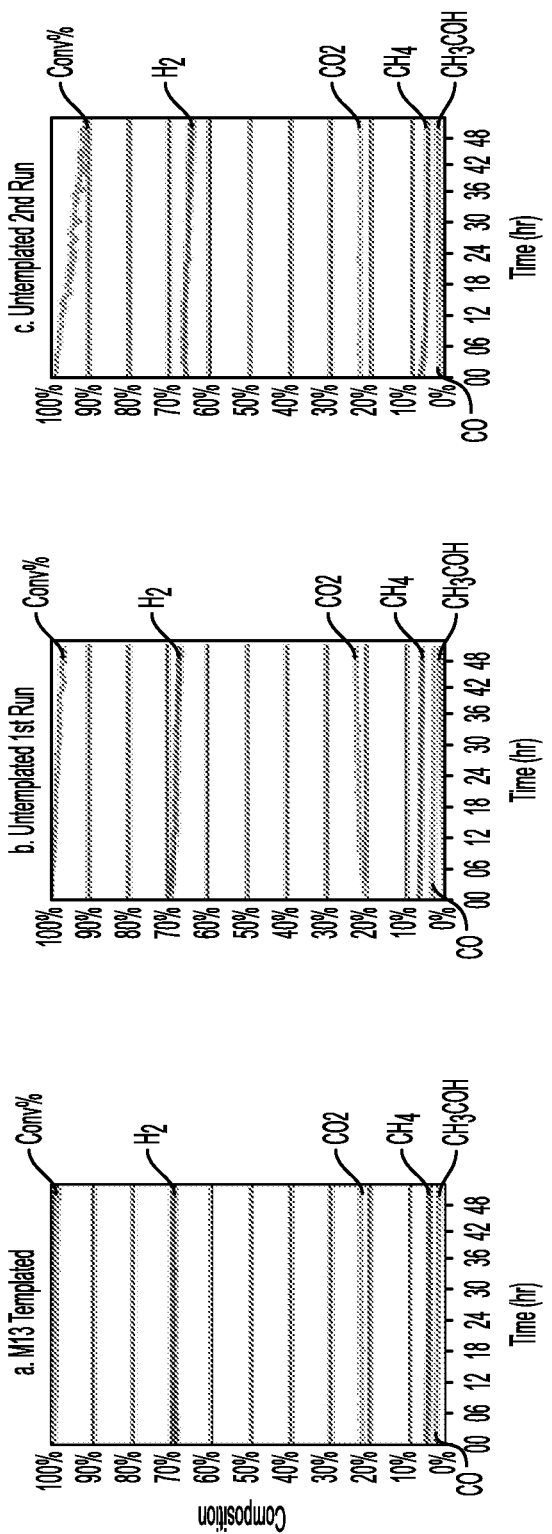
FIGS. 9A-9C are graphs depicting product output of different catalyst systems over time.
FIGS. 9D-9E are X-ray diffraction patterns of different catalyst systems after use.
Figure 9:
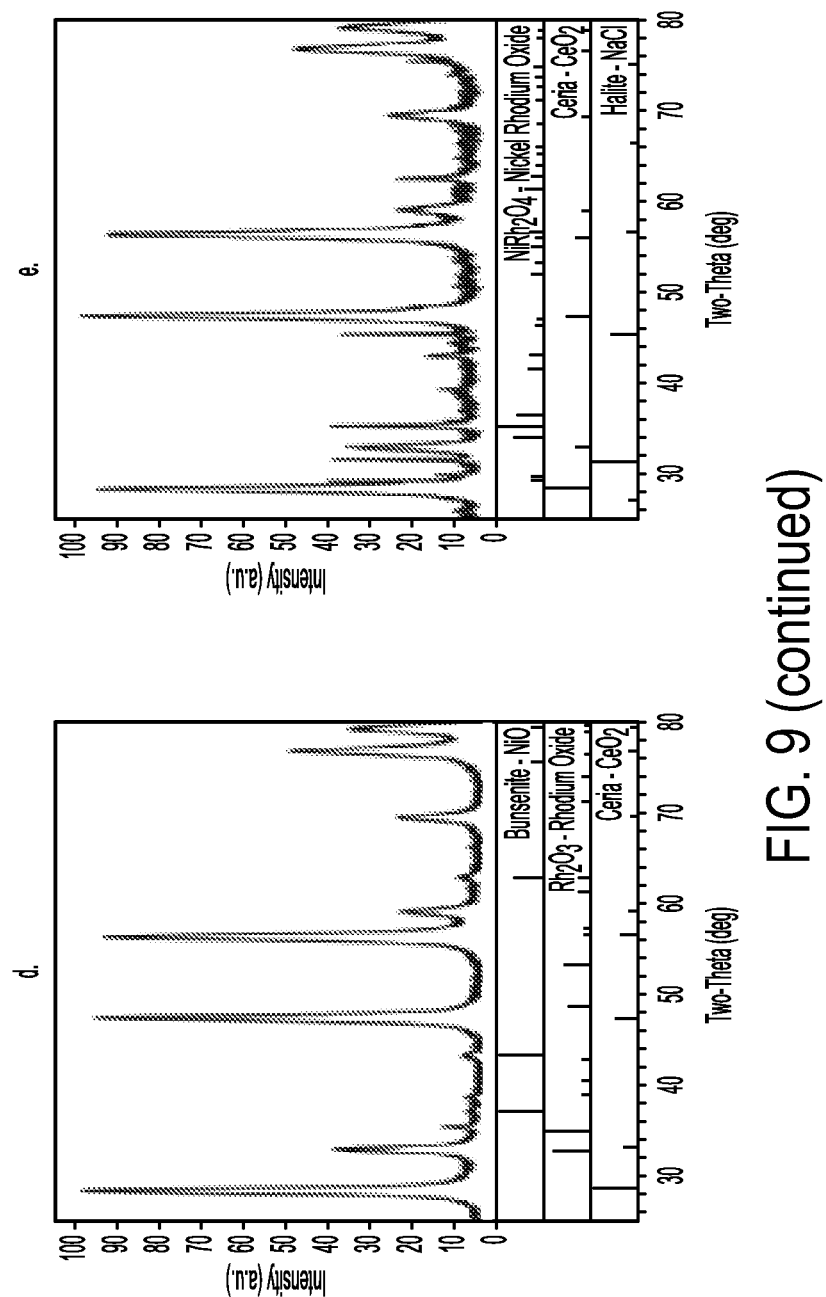

M13-templated catalyst showed improved thermal stability compared to untemplated catalyst through a combination of resistance to surface deactivation on rhodium and less phase segregation. While M13-templated catalyst showed steady output over a 52 h measurement, untemplated catalyst showed decreased conversion over time, as shown in FIGS. 9A-9C ((a) With M13 templating, total conversion dropped by only 1% over 52 h; (b) Untemplated catalyst showed total conversion dropping by 4% and decreased hydrogen in the product fraction over 52 h. (c) Faster deactivation is seen in a second 52 h test of untemplated catalyst after regeneration under air for 1 h, with total conversion dropping by 10%.). The decreased conversion was partially recovered by exposing the catalyst to air for a short time, indicating a surface deactivation most likely caused by carbon buildup. However, a second 52 h measurement of the reactivated untemplated catalyst showed more rapid deactivation, indicating that the degradation of the catalyst was also caused by long-term effects. Nanowires were not tested a second time as they did not show noticeable deactivation over the first test.

XRD of the catalyst samples put on stream for stability tests shows that, in both cases, impurity phases begin to appear (FIGS. 9D-9E; (d) XRD of M13-templated catalyst after 52 h on stream. Peaks for NiO, $Rh_2O_3$, and $CeO_2$ were seen. (e) XRD of untemplated catalyst after two 52 h measurements with 1 h of regeneration under air. $CeO_2$ and NaCl peaks are seen, accompanied by Ni—Rh oxides. The double peak at 30° is characteristic of $NiRh_2O_4$.). In the case of M13-templated catalyst, small NiO and $Rh_2O_3$ peaks were seen after a 52 h measurement at 450° C. and 120,000 h⁻¹ GHSV. In the case of the untemplated sample, while NiO and $Rh_2O_3$ may be forming, a double peak at 30° suggested the formation of more complex mixed oxides such as $NiRh_2O_4$ after two 52 h measurements at 450° C. and 120,000 h⁻¹ GHSV. On the basis of XRD peak broadening, the characteristic size of the NiO phases in the templated catalyst after 52 h on stream was ~14 nm, while the $Rh_2O_3$ phases were ~37 nm. In the untemplated sample after 105 h, the $NiRh_2O_4$ phase showed a characteristic size of ~52 nm. The more complex mixed nickel rhodium oxide phase was not seen in the M13-templated catalyst, suggesting that the extent to which nickel oxide and rhodium oxides mixed to form mixed nickel rhodium oxides may play a role in the permanent deactivation of the catalyst over time.

To determine what role chlorine played in the catalytic activity of this system, 1% Rh/10% Ni@$CeO_2$ was formed using cerium, rhodium, and nickel nitrate precursors. These particles performed poorly at 200° C. compared to the particles synthesized from chloride precursors. While untemplated 1% Rh/10% Ni@$CeO_2$ nanoparticles made from chloride precursors were still fairly active at 200° C. with 73% ethanol conversion, 1% Rh/10% Ni@CeO2 catalysts made from nitrates only showed 45% ethanol conversion. The poor performance of the catalysts made using only nitrates suggested that the chlorine ions are playing a role in the activity.

Other embodiments are within the scope of the following claims.

What is claimed is:

1. A catalytic material, comprising a plurality of catalytically active nanoparticles formed together to provide a porous catalytic material, the porous catalytic material having a BET surface area of greater than 150 m²/g.

2. The catalytic material of claim 1, wherein the catalytically active nanoparticles comprise metal oxide nanoparticles.

3. The catalytic material of claim 2, wherein the metal oxide comprises a manganese oxide, a magnesium oxide, an aluminum oxide, a silicon oxide, a zinc oxide, a copper oxide, a nickel oxide, a cobalt oxide, an iron oxide, a titanium oxide, yttrium oxide, a zirconium oxide, a niobium oxide, a ruthenium oxide, a rhodium oxide, a palladium oxide, a silver oxide, an indium oxide, a tin oxide, a lanthanum oxide, an iridium oxide, a platinum oxide, a gold oxide, a cerium oxide, a neodymium oxide, a praseodymium oxide, an erbium oxide, a dysprosium oxide, a terbium oxide, a samarium oxide, a lutetium oxide, a gadolinium oxide, a ytterbium oxide, a europium oxide, a holmium oxide, a scandium oxide, or a combination thereof.

4. The catalytic material of claim 1, wherein the catalytically active nanoparticles comprise a transition metal.

5. The catalytic material of claim 1, wherein the catalytically active nanoparticles comprise ceria.

6. The catalytic material of claim 5, wherein the catalytic material comprises thermal stability whereby a measured x-ray diffraction pattern of the catalytic material is substantially unchanged after 60 hours at 400° C.

7. The catalytic material of claim 1, comprising pores having a pore width of less than 20 nm.

8. The catalytic material of claim 1, wherein the catalytic material is deposited on a support material.

9. The catalytic material of claim 8, wherein the support material comprises a ceramic support material.

10. The catalytic material of claim 8, wherein the ceramic support material comprises a material selected from the group of silica, α-alumina, β-alumina, γ-alumina, rutile titania, austentite titania, ceria, zirconia, manganese oxide, manganese phosphate, manganese carbonate, zinc oxide, or a combination thereof.

11. The catalytic material of claim 1, wherein the catalytically active nanoparticles comprise a mixed metal oxide having the formula:

$$M^1_i M^2_j O_x$$

wherein i, j, and x are integers, and $M^1$ and $M^2$ are independently selected from magnesium, aluminum, silicon, scandium, titanium, manganese, iron, cobalt, nickel, copper, zinc, yttrium, zirconium, niobium, ruthenium, rhodium, palladium, silver, indium, tin, lanthanum, cerium, praseodymium, neodymium, samarium, europium, gadolinium, terbium, dysprosium, holmium, erbium, ytterbium, lutetium, iridium, platinum, and gold.

12. The catalytic material of claim 11, wherein the catalytic material is a nanowire.

13. The catalytic material of claim 1, wherein the catalytic material is a nanowire.

* * * * *